's Patent

United States Patent [19]

Mourrier et al.

[11] Patent Number: 4,600,311
[45] Date of Patent: Jul. 15, 1986

[54] MATERIAL-PROCESSING SCREW MACHINE

[75] Inventors: Francis Mourrier, Autun; Félix Pelissier, Le Creusot, both of France

[73] Assignee: Clextral, Paris, France

[21] Appl. No.: 709,273

[22] Filed: Mar. 7, 1985

[30] Foreign Application Priority Data

Mar. 8, 1984 [FR] France ............................. 84 03583

[51] Int. Cl.⁴ .................... B29B 1/06; B01F 7/08
[52] U.S. Cl. ........................... 366/88; 366/90; 366/322; 366/323; 425/376 R
[58] Field of Search ............... 366/88, 89, 90, 91, 366/81, 82, 319, 322, 318, 321, 323, 79; 925/376 R, 208, 207, 204

[56] References Cited

U.S. PATENT DOCUMENTS

| | | | |
|---|---|---|---|
| 3,305,894 | 2/1967 | Boden | 366/88 |
| 3,382,536 | 5/1968 | Fritsch | 366/88 |
| 3,850,414 | 11/1974 | Scharer | 366/89 |
| 4,423,960 | 1/1984 | Anders | 366/89 |

FOREIGN PATENT DOCUMENTS

| | | |
|---|---|---|
| 2924462 | 1/1981 | Fed. Rep. of Germany . |
| 2042191 | 1/1971 | France . |
| 2401754 | 7/1978 | France . |

Primary Examiner—Robert W. Jenkins
Attorney, Agent, or Firm—Pollock, Vande Sande & Priddy

[57] ABSTRACT

The material-processing machine comprises at least a screw (11) driven in rotation inside a sleeve (1) and constituted by a central driving shaft (2) on which are mounted a plurality of screw elements (3) forming a stack of adjoining elements clamped between an abutment and clamping means placed respectively at the two ends of the shaft (2). The clamping means (4, 5) are arranged in such manner as to exert on the stack of screw elements (3) a prestressing force capable of opposing the separation of the screw elements (3) from each other in operation of the machine. The invention is especially applicable to the construction of screw extruders.

4 Claims, 4 Drawing Figures

MATERIAL-PROCESSING SCREW MACHINE

FIELD OF THE INVENTION

The invention relates to a material-processing screw machine comprising at least one screw driven in rotation inside a sleeve. The invention is more particularly applicable to extruders having one or more screws and, more generally, to machines in which a material driven by the rotation of screws is mixed, kneaded, triturated and put under pressure by passage in the sleeve.

BACKGROUND OF THE INVENTION

A screw machine such as an extruder employed for producing plastics materials comprises an elongated sleeve surrounding one or more screws. If the machine has a single screw, the latter is placed in a cylindrical bore of the sleeve. In the case of machines having two screws, the sleeve is provided with two cylindrical bores having parallel axes, the distance between the axes being less than the diameter of the bores so as to form two intersecting lobes in which the two screws are disposed, these screws engaging into one another. If the screws are driven in the same direction, they are identical. On the other hand, they are symmetrical if they are driven in opposite directions. For this purpose, the screws are driven by a mechanism placed at one end of the sleeve.

As it may be of interest to vary the screw threads of the screws, the latter are sometimes formed by screw-threaded elements in the form of hollow collars mounted on a central driving shaft so as to form a stack of adjoining elements which are connected to the shaft to be driven in rotation by the latter, for example by means of splines projecting from the shaft and engaging in corresponding grooves formed in the inner wall of the collars. The latter are stacked and clamped between two abutments placed at the two ends of the shaft, namely usually a fixed abutment placed at one end and a clamping nut screwed on a screw thread formed on the other end of the shaft. With this arrangement, one or more screw-threaded elements may be easily changed for modifying the pitch of the threads or for replacing a worn element.

The material driven in the screws is usually put under pressure and therefore has a tendency to spread apart adjacent elements and to infiltrate therebetween. It may then reach the splines and possibly harden. The elements then become difficult to demount and the splined shaft must be cleaned each time the elements are changed and this operation may be rather long. It has been attempted to overcome this drawback by placing sealing gaskets between the screw-threaded elements, but experience has shown that, when the pressures are high, this drawback is difficult to avoid. Indeed, the clamping nut is used solely for interconnecting the elements and, as it must be easily demounted, it cannot exert sufficient pressure to oppose in a definite manner a separation of the elements which would allow the infiltration of material.

Further, the shafts of the screws must of course be mounted in bearings. When the machine is an extruder provided with dies at its downstream end, the screws are held by bearings solely located on the driving end. At their other end, they are held centered relative to the sleeve by the pressure of the extruded material. In other applications, the machine does not operate as an extruder but as, for example, a mixer-kneader. The material may not be put under pressure at the downstream end and may be discharged through a lateral orifice in the sleeve. In this case, it is more normal to carry each screw by means of two bearings placed at both its ends. However, in certain processing methods, it is conventional to pass the material through pressurizing zones arranged along the shaft and for example constituted by retarding zones comprising closer pitch or reversed threads. In this case, the pressure of the material in the zone in which the screws are engaged in one another produces a force which tends to move these screws apart so that they are subjected to bending stresses. Consequently, there is produced in the central part a deflection which, it is often considered, may reach three times the radial clearance of the screws. Therefore, the screw-threaded elements are subjected in the engaging section to high axial compression stresses and, on the other hand, tend to move away from each other on the periphery. This ofsetting of the axial compression force may result in a bruising effect on the bearing surfaces of the elements. Moreover, owing to this slight bending of the screws, the screw threads are not evenly worn.

SUMMARY OF THE INVENTION

An object of the invention is to provide improvements to overcome these drawbacks.

According to the invention, the means for clamping the screw-threaded elements is so arranged as to exert on the stack a pre-stressing force which is capable of opposing the tendency of the screw-threaded elements to move away from each in operation of the machine.

In a preferred embodiment, the clamping means comprise a hydraulic jack consisting of a piston and a cylindrical body, one of which bears against the central shaft while the other bears against the stack, and means for mechanically locking the piston relative to the body after the stack has been pre-stressed. The clamping jack comprises a nut screwed on a corresponding screw thread of the central shaft and on which are formed two cylindrical bearing portions which have different diameters and are located on each side of an annular bearing portion and along which the cylindrical body is slidable, said cylindrical body being provided internally with two cylindrical bearing surfaces having inside diameters respectively equal to the outside diameters of the bearing surfaces of the nut, and disposed on each side of an annular bearing surface confronting the annular bearing surface of the nut; the space between the two annular bearing surfaces constitutes a jack chamber which is closed by sealing gaskets interposed between the cylindrical bearing surfaces of the same diameter, this space being for example connected to means for supplying fluid under pressure. The means for locking the piston relative to the cylindrical body comprise a nut screwed on one of these two elements and provided with means for hooking onto the other element so as to oppose the sliding of these elements after the pressure of the fluid has been released.

According to another essential feature, the screw-threaded elements are symmetrical with respect to a median plane perpendicular to their axis so that after use in one direction, they may be turned round for use in the other direction.

BRIEF DESCRIPTION OF THE DRAWINGS

A better understanding of the invention will be had from the description of a particular embodiment which is given by way of example and shown in the accompanying drawings.

DETAILED DESCRIPTION

Figure 1:
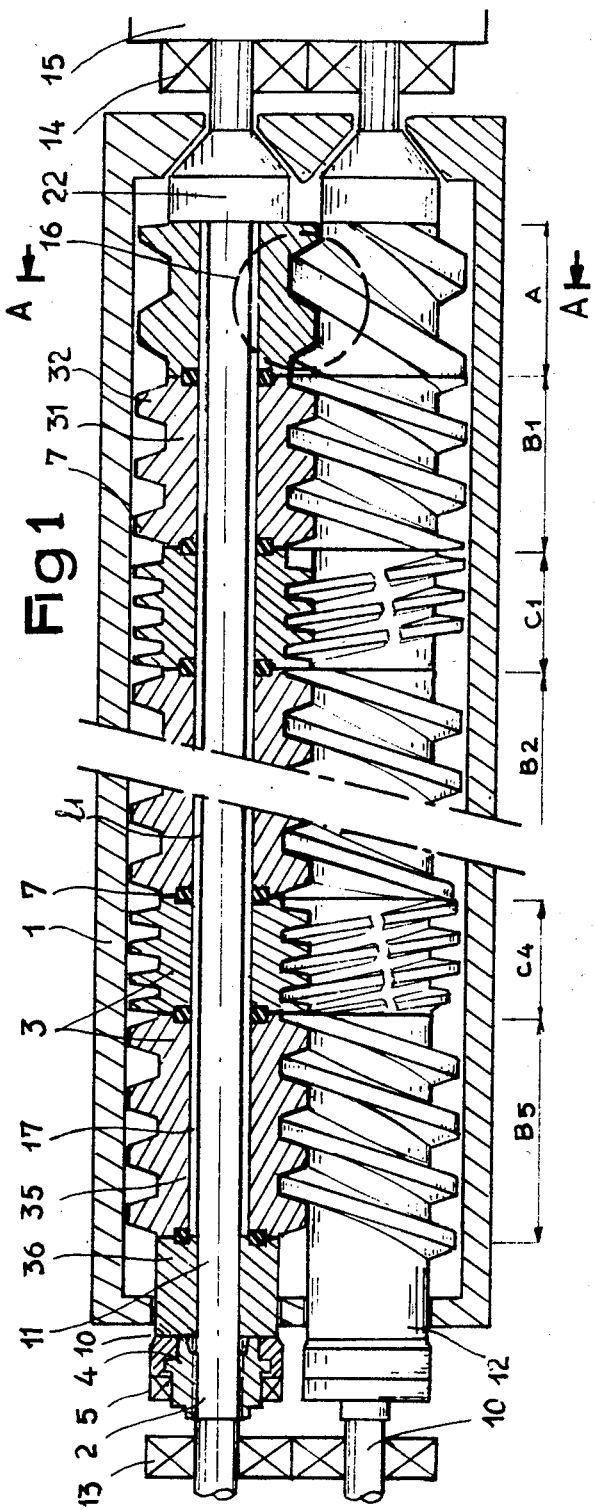
FIG. 1 is a diagrammatic longitudinal sectional view from above of an improved screw machine according to the invention.
Figure 2:
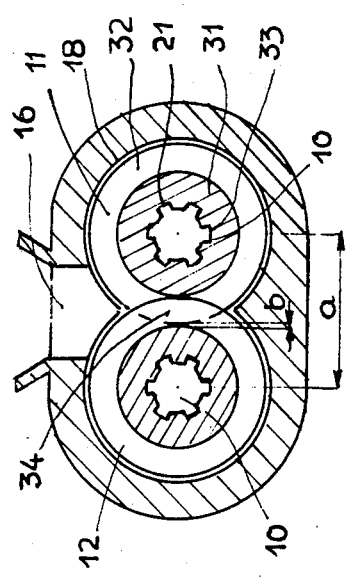
FIG. 2 is a cross-sectional view taken on line A—A of FIG. 1.

FIG. 1 is a longitudinal sectional view, in a plane containing the axes of the screws, of a machine comprising, inside a sleeve 1, two screws 11 and 12 having parallel axes 10 and carried at their ends by bearings 13 and 14.

In the illustrated embodiment, the two screws 11 and 12 are driven in rotation in the same direction by a driving unit 15 and their screw threads are therefore identical. The material, which is introduced through an upstream orifice 16 centered in the plane of symmetry of the sleeve, is driven toward the downstream end by a conveying section A having a large pitch, and then compressed in a section B1 having a closer pitch preceding a retarding section C1 which may be formed, for example, by screw threads having inverted pitches and provided with openings for the passage of the material toward the downstream end. In order to compensate for this retarding effect, the material is therefore highly compressed in the section B1. The material is then expanded in a section B2 having a direct pitch and is then compressed again before passing into a new retarding section C2, and so on to the downstream end of the sleeve provided with an outlet orifice 17.

It will be understood that this screw profile is given merely by way of example since each application will require a particular profile. This is the reason why the screw threads of different pitches are formed on juxtaposed elements respectively corresponding to the successive sections A, B1, C1, B2, C2, etc. for the purpose of modifying the profile of the screws as desired.

Each screw will therefore be constituted in the conventional manner by a shaft 2 on which the elements 3 constituting a stack will be mounted one after the other. Each element 3 has a cylindrical central part 31 provided on its periphery with one or more helical threads 32 having a pitch particular to the element.

In order to transmit the rotating torque to the elements, the shaft 2 is advantageously provided with splines 21 which engage in corresponding grooves 33 formed on the inner wall of the cylindrical part 31 of the element.

The two screws engage in one another and are therefore placed in two intersecting cylindridal lobes 18 having a diameter slightly larger than the outside diameter of the threads 32. The distance a between the axes of the screws is less than their diameter, the difference being a little greater than the depth of the threads, so that the periphery of the thread of a screw 11 is spaced away from the thread root of the other screw 12 by a clearance b. The profile of the threads is such that the latter are tangent to one another in the section of engagement 34 so as to produce a scraping effect.

Normally, the stack of adjoining elements thus formed is clamped between two abutments, namely a fixed abutment 22 placed at one end of the shaft and a movable abutment placed at the other end and formed usually by an internally screw-threaded nut screwed on the corresponding screw thread formed on the end portion of the shaft 2. As mentioned before, such a nut only serves to maintain the screw-threaded elements on the shaft 2 and is not intended to exert a very high clamping pressure.

Figure 3:
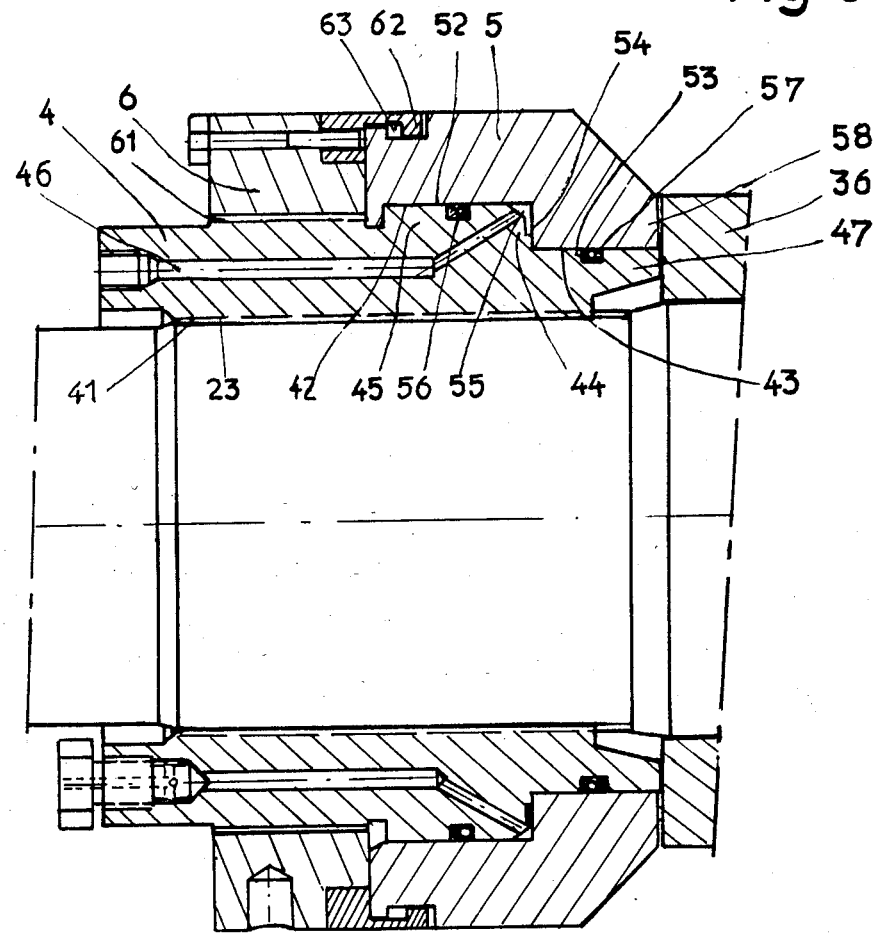
FIG. 3 is a longitudinal sectional detail view of the means for clamping the screw-threaded elements.

According to the essential feature of the invention, these tightening or clamping means are formed by a hydromechanical nut 4 which is shown in detail in FIG. 3 and is capable of exerting a veritable pre-stressing force on the elements 3 capable of preventing them from moving away from each other in machine operation.

As can be seen in FIG. 3, the nut 4 is provided with an internal screw thread 41 which is capable of being screwed onto a corresponding screw thread 23 on the end portion of the shaft 2. The nut 4 is provided on its periphery with two cylindrical bearing surfaces 42, 43 which have different diameters and are located on opposite sides of an annular wall 44 and thus define an annular piston 45. The latter is surrounded by a cylindrical collar 5 provided with an internal bore defining two cylindrical bearing surfaces 52, 53 which have diameters respectively equal to those of the bearing surfaces 42 and 43 of the nut and which are disposed on opposite sides of an annular wall 54 in confronting relation to the wall 44 of the nut 4. The collar 5 thus forms the body of a hydraulic jack whose piston is formed by the part 45 of the nut 4, the latter having a conduit 46 which opens onto the chamber 55 of the jack defined between the annular walls 44 and 54 and which can be connected to means supplying fluid under pressure. The chamber 55 of the jack can thus be put under pressure, it being rendered fluidtight by gaskets 56, 57 interposed between the corresponding cylindrical bearing surfaces 42, 53 and 43, 53.

In this way, after having mounted the screw-threaded elements 3 one after the other on the shaft 2 so as to form a stack placed against the fixed abutment 22, the nut 4 is screwed onto the screw thread 23 until its end 47 abuts against the first element 35 of the stack, for example through a sleeve 36 which extends in a fluidtight manner through the end of the sleeve 1. The chamber 55 of the jack is then put under pressure and, with the nut 4 fixed in position, the cylindrical body 5 moves toward the stack and bears against the sleeve 36 by its end 58. The screw elements 3 are thus subjected to a pressure which creates a pre-stressing force which may be measured by controlling the pressure of the supply of fluid to the jack.

Previously, it was possible to determine the force which moves apart the bearing surfaces 36 (FIG. 4) of the screw elements 3 which is due to the pressure P1 exerted by the material on the threads 32, mainly in the zones C having reversed pitches and to which the stresses related to the bending of the shafts 2 of the screws, which depends on the allowed deflection, are added. It is often agreed that the latter may be as much as three times the radial clearance (b) of the screws, but the invention in fact enables this to be reduced. Indeed, by subjecting the screw-threaded elements 3 to a prestressing force, the central parts 31 of the screwthreaded elements are compressed, and therefore the state of bending equilibrium of the screw is modified.

Thus it is possible to determine by calculation the force required to move apart the screw-threaded elements and consequently the minimum pre-stressing force which must oppose it and the corresponding pressure of the jack. The hydromechanical nut just described permits the obtainment of very high pre-stressing forces, on the order of 20 tons, for example, for screws having a distance (a) of 200 mm between their axes.

In order to avoid a permanent maintenance of the pressure of the hydraulic fluid, the nut 4 is provided with locking means constituted by a nut 6 screwed onto a screw thread 61 formed on the periphery of the nut 4. After having put the jack under pressure, it is sufficient to turn the locking nut 6 in the required direction to lock in a relative position the two parts 4 and 5 of the jack and consequently maintain the pre-stressing of the screw elements. The pressure in the chamber 55 of the jack can then be eliminated. Further, the nut 4 is provided with a hooking ring 62 which engages in a corresponding groove 63 on the periphery of the body 5 of the jack. After the release of the jack, the ring 62 enables the annular surfaces 44 and 54 of the piston 4 and the body 5 of the jack to be brought back into contact by rotation of the nut 6.

According to another feature of the invention, the screw-threaded elements 3 are separated by sealing gaskets 7 which are symmetrical relative to the transverse planes P2 of junction between the adjacent elements. For this purpose, the elements 3 are provided with two semi-grooves 71, 72 provided respectively at each end of the inner wall of the central part 31 of the element 3, these semi-grooves forming, by the assembly of two adjacent elements, a groove which is symmetrical relative to the plane P2 and in which the sealing gasket 7 can be placed. The height of the groove and of the gasket must be limited so that the bearing surfaces 36 have a sufficient section for transmitting the pre-stressing force with no risk of crushing.

Figure 4:
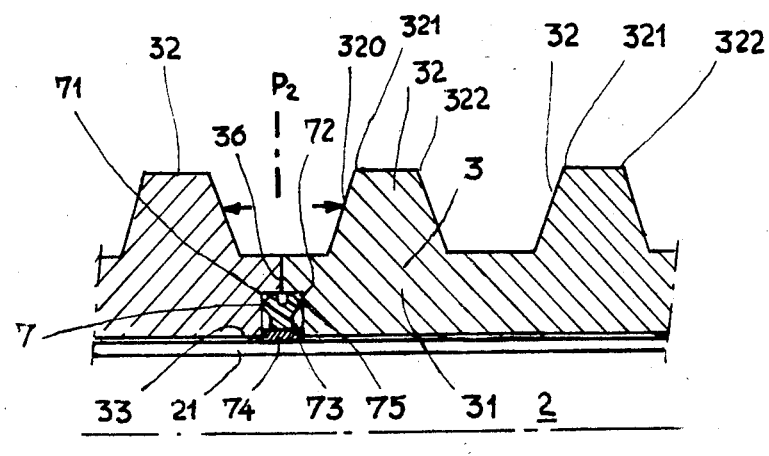
FIG. 4 is a detail view of the junction between two adjacent elements.

According to another advantageous feature of the invention, the gasket 7, as shown in FIG. 4, comprises a ring of an elastically yieldable material 73 placed against a metal ring 74 whose inside diameter is equal to the outside diameter of the splines 21 of the shaft 2. Consequently, the elastically yieldable ring 73 is well maintained in the bottom of the groove 71, 72, the thickness of the ring 74 exceeding the clearance existing between the splines 21 of the shaft 2 and the corresponding grooves 33 of the screw elements 3 so as to avoid extrusion of the ring 73.

The gasket 7 advantageously has two lips which are symmetrical relative to the plane P2 and which are applied against the lateral sides of the semi-grooves 71, 72 by circular edges 75.

The screw-threaded elements 3 are therefore symmetrical relative to their median planes and can be turned round after use in one direction. Indeed, in the conveying sections B1, for example, the threads 32 are worn essentially on their downstream surface 320, in particular at the corner 321 of the thread, the upstream corner 322 being subjected to smaller forces. Consequently, the thread is worn unevenly. In the foregoing arrangements, the bending of the screws produced an irregular bruising of the bearing surfaces 36 which precluded the turning round of the elements. Owing to the arrangement according to the invention, the bearing surfaces 36 are subjected to an evenly distributed pressure and this avoids risk of bruising. Consequently, it is possible to turn the screw-threaded elements round after use in one direction for a new use in the other direction, which doubles the life of the elements.

Further, by practically precluding the moving apart of the screw-threaded elements 3, even in the central part of the screw, infiltration of material in the grooves is avoided, so that the grooves always remain clean.

The invention is particularly advantageous in the case just described of a machine having a plurality of screws carried by bearings at their two ends and consequently subjected to bending stresses, but it remains of interest for extruders having one or more screws which have bearings only on the upstream end.

We claim:

1. A material-processing screw machine comprising a sleeve, at least one screw inside the sleeve, means for driving the screw in rotation, the screw including a central driving shaft, a plurality of screw elements mounted on the shaft and a sealing gasket interposed between the screw elements, the screw elements and gaskets forming a stack of adjoining elements, an abutment placed at one end of the shaft and clamping means placed at an opposite end of the shaft, said clamping means being capable of exerting on the stack of elements a pre-stressing force capable of opposing separation of the screw elements from each other in operation of the machine, said clamping means comprising a hydraulic jack including two members consisting of a piston and a cylindrical body in which the piston is movable, one of said two members bearing against the central shaft and the other of said two members bearing against the stack, and means for mechanically locking the piston relative to the body of the jack after the stack has been pre-stressed.

2. A machine according to claim 1, wherein the jack comprises a nut forming a piston, a corresponding screw thread on the central shaft on which the nut is screw-threadedly engaged, two cylindrical bearing surfaces which have different diameters provided on the nut, and an annular wall disposed between the two bearing surfaces, the cylindrical body surrounding the piston being provided internally with two cylindrical bearing surfaces which have the same diameters as the bearing surfaces of the nut and are slidably mounted on the bearing surfaces of the nut, an annular wall confronting the annular wall of the piston and disposed between the two bearing surfaces of the cylindrical body, the assembly of the cylindrical body and the piston defining a jack chamber closed by sealing gaskets interposed between the cylindrical bearing surfaces having the same diameter, means for supplying fluid under pressure being connected to the jack chamber, and the means for locking the piston relative to the cylindrical body being a nut screwed on one of said two members.

3. A machine according to claim 1, wherein the screw elements are symmetrical relative to a median plane perpendicular to an axis of the screw elements so as to be capable of being turned round after use in one direction for use in an opposite direction.

4. A machine according to claim 1, wherein the central shaft has splines and the screw elements are provided internally with corresponding grooves engaged with the splines, each sealing gasket comprising a metal ring having an inside diameter equal to the outside diameter of the splines of the shaft and mounted on the splines and a thickness exceeding a clearance existing between crests of the splines and bottoms of the grooves, and a ring composed of an elastically yieldable material surrounding and mounted on the metal ring.

* * * * *